3,215,543
VITREOUS BODY INCLUDING MICA IN FINELY
DIVIDED STATE
Michel Bre, Paris, France, assignor to Compagnie de
Saint-Gobain, Neuilly-sur-Seine, France
No Drawing. Filed Dec. 4, 1961, Ser. No. 157,009
Claims priority, application France, Dec. 8, 1960,
846,319
6 Claims. (Cl. 106—47)

This invention relates to a body comprising finely divided mica dispersed in a vitreous matrix.

Vitreous bodies in which finely divided mica is incorporated in a vitreous matrix are well known. According to the invention, the vitreous matrix is a glass, the essential constituents of which are an oxide of alkali metal ($R_2O$), an oxide of divalent metal of the group consisting of Zn, Ca, Mg, Sr, Cd, Ba, (RO), phosphoric anhydride ($P_2O_5$), and alumina ($Al_2O_3$), these constituents being present in the following molecular percentages, defined with respect to the molecular percentage $d$ of the oxide of divalent metal:

Oxide of divalent metal (RO)—from 6 to 20
Phosphoric anhydride ($P_2O_5$)—from $$\left(36-\frac{d}{3}\right) \text{ to } (56-d)$$

Alumina ($Al_2O_3$)—from 6 to $$\left(16+\frac{d}{6}\right)$$

Oxide of alkali metal ($R_2O$)—from 22 to 42.5 the alumina being less than 20% by weight of the glass.

For the oxide of divalent metal there is preferably employed ZnO, CaO, and MgO. The oxides of divalent metal may be employed either alone or in various mixtures, the mixtures employed being chosen principally with a view to facilitating production of the glass or to improving its resistance to attack by water.

As oxide of alkali metal there may be employed sodium oxide ($Na_2O$), potassium oxide ($K_2O$), or more frequently a mixture of sodium and potassium oxide. One may also employ lithia ($Li_2O$) in mixtures with sodium and potassium oxides, the lithia being employed in limited quantities not exceeding 5% by weight of the glass.

The mica employed for the production of bodies in accordance with the invention may be either natural mica or synthetic mica. Synthetic mica is employed particularly when the vitreous body in accordance with the invention is designed to endure particularly high service temperatures. As is well known, natural micas lose all of their constitution water at temperatures which are on the order of 700–900° C. The loss of constitution water produces a complete modification of the structure of the mica and of its properties. Synthetic micas do not undergo modifications of structure by being heated up to their fusion temperature and, as a result, maintain their structure and properties up to temperatures which are even above 1200° C.

Vitreous bodies in accordance with the invention present all of the following properties:

(a) They are easily molded and, as a result, are readily formed into complex forms. As regards this property, they may be compared with a vitreous body having a mica filler which is agglomerated with the aid of a lead glass.

(b) Their electrical resistivity is generally between $1,000 \times 10^{10}$ ohms cm.²/cm. and $6,000 \times 10^{10}$ ohms cm.²/cm.

(c) Their dielectric strength is on the order of 25–26 kv./mm. Vitreous bodies having a mica filler agglomerated by a lead glass, on the other hand, generally present a lower dielectric strength, on the order of 19 kv./mm.

(d) Their density varies according to the relative proportions of the mica and glass employed in their fabrication, and, according to the conditions of such fabrication, is generally between 2.2 and 2.7. Such density is thus much less than that of the vitreous bodies having a mica filler agglomerated with a lead glass; the density of such latter body is generally above 3.0.

(e) Their coefficient of expansion is generally between 125 and $150 \times 10^{-7}$. Products in accordance with the invention may be made, however, to have a coefficient of expansion between 130 and $140 \times 10^{-7}$. This relatively high coefficient of expansion facilitates the secure retention of metal inserts in the body during the forming and in particular during molding operations.

(f) Their resistance to compression is variable, as is their density as shown above, depending upon the relative proportions of mica and glass utilized in making a particular body. Such resistance to compression also varies according to the conditions under which the body was made. Such resistance is generally on the same order as that of bodies made by finely divided mica agglomerated with the aid of lead glass in glass-mica bodies in which the glass content is 50% or above.

(g) Their resistance to water and to atmospheric agents is excellent. Expressed in weight of material attacked with relation to a unit area of surface attacked, this resistance is considerably better (generally from 5 to 20 times) than that of bodies of finely divided mica agglomerated with lead glass. This characteristic, which is of great practical importance, allows glass bodies in accordance with the invention to be exposed to atmospheric conditions for long periods of time without any appreciable changes of their mechanical or electrical characteristics.

(h) Their absence of toxicity removes all risk during their manufacture.

(i) They can be machined quite easily, being readily drilled, formed on a cutting machine, planed, milled, etc.

To lower the temperature at which the mixture of mica and glass must be held during working of the agglomeration, it is preferable to employ a glass having a low alumina and oxide of alkali metal content and a high content of oxide of divalent metal.

The attackability by water of the vitreous body in accordance with the invention is lowest when the ratio of molecular content of phosphoric anhydride to the molecular content of oxide of alkali metal is highest. If it is desired to further improve the resistance to atmospheric attack of bodies in accordance with the invention, boric anhydride ($B_2O_3$) may be added to the glass in amounts up to a molecular percentage of 7% of the glass. Such use of $B_2O_3$ has the consequence of producing a lessening of the coefficient of expansion of the glass.

Vitreous bodies in accordance with the invention are obtained by mixing mica in divided state with phosphoric glass having the chemical composition given above, and by then heating the mixture at a temperature sufficient to obtain softening of said glass. When the mixture has become sufficiently plastic, it is generally formed by being compressed in molds.

The following method of fabrication, in particular the thermal treatment, described below by way of non-limiting examples, has been established with a view to avoiding the decomposition of the mica and its attack by the phosphoric glass employed, as well as avoiding any substantial devitrification of such glass. Finely divided mica is intimately mixed with the phosphoric glass, the latter being in the form of a fine powder. In such mixture the proportion of glass present will usually be from 30–70% by weight.

mica being the remainder. For most uses the glass will constitute from 30–50% by weight of the mixture, mica being the remainder. The product thus obtained is first formed in the cold into tablets such as discs having a diameter of about 30 mm. and a thickness of about 20 mm. The discs are subjected to a first heating for an hour and then reduced to powder by being crushed. The powder thus obtained is introduced into molds having cavities corresponding to the shape of the desired object. The powder in the mold is first heaped up and then is compressed with the aid of a piston which may form a movable wall of the mold cavity. The thus compressed material is then subjected to a second heating for about an hour and then the molded article is subjected, while hot, to a final forceful compression.

Generally the two heating operations described above are carried out at substantially the same temperature. The temperature will vary according to the characteristics of the mica and of the phosphoric glass used. If natural mica is used, the temperature may be on the order of 500–550° C. and the final pressure may be on the order of 3,000 kg./cm.$^2$. When synthetic micas are used, the temperature employed may be higher, for example, on the order of 700° C., and the final pressure employed may be less than 3,000 kg./cm.$^2$.

The glass chosen is one lying within the above set forth general range of compositions in accordance with the present invention, such glass being one which has characteristics which are adapted to the variety of mica employed, to the particular conditions of the manufacturing method employed, and to the properties desired in the final article.

There are given below four non-limitative examples by which vitreous bodies in accordance with the invention may be made:

*Example 1*

Seventy parts by weight of powdered phlogopite mica (magnesian mica) broken or crushed to pass through a 200 micron screen were mixed with 30 parts by weight of powdered phosphoric glass passing through a 50 micron screen. The phosphoric glass had a molecular composition as follows:

| | Percent |
|---|---|
| $P_2O_5$ | 43 |
| $Al_2O_3$ | 11.5 |
| $Na_2O$ | 28 |
| $K_2O$ | 11 |
| $ZnO$ | 6.5 |

Fifteen grams of the mixture was formed into discs in the cold in a tablet mold having a cavity 30 mm. in diameter under a pressure of 2,000 kg./cm.$^2$.

The cylinder thus obtained was introduced into a furnace maintained at a temperature of 500° C. The cylinder was maintained in the furnace for about an hour and then was withdrawn and cooled. After cooling it was crushed into fragments having particles less than 0.5 mm. in size. The powder thus obtained was placed into a mold preferably lubricated, for example, with the aid of a mixture of oil and graphite, the powder being submitted to a treatment of reagglomeration under pressure. Such mold was made up of a steel cylinder having a passage through which a piston travelled. The interior diameter of the cylinder was 31 mm. The powder which was poured into the bottom of the mold was heated to 500° C., was maintained at such temperature for about an hour, and was then compressed at such temperature under a pressure of about 3,000 kg./cm.$^2$. The compressed article, in the form of a disc, was then removed from the mold while hot. Such disc had a density of 2.45, and had a polished grey surface of good appearance.

If it is necessary, the cylindrical disc may be, for example, machined exactly to the dimensions desired.

The electric resistivity and the dielectric strength of the disc were then measured. The following results were obtained:

Electrical resistivity—$18 \times 10^{12}$ ohms cm.$^2$/cm.
Dielectric strength—25 kv./mm.

The resistance to water of the disc thus made may likewise be determined. To make such measurement the cylinder is placed in a kiln at 120° C. and is allowed to remain in the kiln at such temperature for 2 hours. After being cooled, the cylinder was weighed, and such first weight noted. The disc was then placed for 24 hours in distilled water at 80° C., following which it was again placed into a kiln maintained at 120° C., the cylinder being left in the kiln for 2 hours. The cylinder was again weighed after cooling, and such second weight was noted. The difference between the first and second weights is the loss in weight relative to the total surface of the disc. The loss of weight referred to a unit of surface of the disc was 0.2 mg./cm.$^2$.

The resistance of compression to a number of discs made in accordance with this example varied from 1,300 to 1,500 kg./cm.$^2$.

*Example II*

Fifty parts by weight of phlogopite mica powder crushed to pass a 200 micron screen was mixed with 50 parts by weight of powdered phosphoric glass passing a 50 micron screen.

The phosphoric glass had a molecular composition as follows:

| | Percent |
|---|---|
| $P_2O_5$ | 34 |
| $B_2O_3$ | 7 |
| $Al_2O_3$ | 6 |
| $Na_2O$ | 25 |
| $K_2O$ | 9 |
| $ZnO$ | 7 |
| $MgO$ | 4 |
| $CaO$ | 4.5 |
| $BaO$ | 3.5 |

As in Example I, 15 grams of the mixture were formed in the cold by an hydraulic press under a pressure of 2,000 kg./cm.$^2$ into a disc having a diameter of 30 mm.

The cylindrical disc thus obtained was introduced into a furnace held at 550° C. The disc was maintained for about an hour in the furnace and then was cooled. The disc was then crushed to a powder. A cylindrical mold was then charged with the powder thus obtained; the surface of the base of the mold cavity had a depression of cross shape. The upper wall of the mold cavity was in the form of a downwardly movable piston. After the mold and its contents had been heated for 1 hour to 550° C., the mold and the piston were placed between the platens of a press which then subjected the content of the mold to a pressure of 3,000 kg./cm.$^2$. After cooling, the object was removed from the mold. Such object was entirely homogeneous, and it presented a cross in relief which faithfully conformed to the shape of the depression in the bottom of the mold cavity.

The density of the thus formed disc was 2.52. Its electrical resistivity was $25 \times 10^{12}$ ohms cm.$^2$/cm.; its dielectric strength was 26 kv./mm.

The resistance to attack by water of the molded object was determined, as in the case of Example I, by finding the loss of weight of the disc while being immersed for 24 hours in distilled water held at 80° C. The loss of weight for a unit of surface of the article was 0.15 mg./cm.$^2$.

The resistance to compression varies, from specimen to specimen, between 1,400 and 1,600 kg./cm.$^2$.

*Example III*

Sixty parts by weight of powdered muscovite mica (white mica) passing through a 200 micron screen was carefully mixed with 40 parts by weight of powdered phosphoric glass passing through a 50 micron screen. The phosphoric glass had the following molecular composition:

| | Percent |
|---|---|
| $P_2O_5$ | 40 |
| $Al_2O_3$ | 9 |
| $Na_2O$ | 37 |
| ZnO | 6 |
| CaO | 4 |
| MgO | 4 |

One hundred grams of the mixture was pressed in a disc or tablet-forming mold having a cavity of 30 mm. in diameter under a pressure of 2,000 kg./cm.$^2$. The cylindrical disc obtained was placed in a furnace held at 550° C., and maintained in the furnace for an hour. It was then cooled and then was crushed in a mortar. The product obtained was introduced into a mold having a diameter of 60 mm. The mold was heated to 500° C. and was maintained at that temperature for an hour. While hot a piston was applied to the mold content with a force of 75 metric tons for a period of 5 minutes, following which the molded article was removed from the mold. The molded article was a disc having a thickness of about 15 mm. and a structure which was compact and homogeneous. It could be cut without difficulty into very thin discs having a thickness of from 0.1 to 0.2 mm. Such thin sections had good mechanical strength and electrical properties.

*Example IV*

Eighty parts by weight of powdered muscovite mica passing a 200 micron screen was mixed with 40 parts by weight of powdered glass passing a 50 micron screen. The phosphoric glass had the following molecular composition:

| | Percent |
|---|---|
| $P_2O_5$ | 33 |
| $B_2O_3$ | 7 |
| $Al_2O_3$ | 7 |
| $Na_2O$ | 19 |
| $K_2O$ | 14 |
| $Li_2O$ | 2 |
| ZnO | 7 |
| CaO | 4 |
| MgO | 4 |
| BaO | 3 |

One hundred and twenty grams of the mixture was pressed by an hydraulic press in a tablet-forming machine having a mold cavity 30 mm. in diameter under a pressure of 2,000 kg./cm.$^2$. The cylindrical disc obtained was charged into a furnace held at 550° C. and maintained therein for an hour. The disc was then cooled and crushed in a mortar.

The article to be formed in this example was a cylindrical electrical insulator having an axially extending metal rod bonded thereto. In forming such insulator there was employed a mold having a circular cylindrical mold cavity 60 mm. in diameter. A cylindrical hole provided axially in the bottom wall of the mold held the cylindrical rod insert of the insulator in an upright axial position. Such rod insert, which was made of steel, had a diameter of 6 mm., and a length of 50 mm. The powder obtained as described above was poured into the mold and about the central rod insert therein to such depth that the rod extended about 30 mm. above the top of the powder in the mold. The mold and its contents were then heated to 550° C. and maintained at such temperature for an hour.

A piston was then introduced into the upper end of the mold. Such piston was circular cylindrical in shape, and accurately fitted within the main vertical walls of the mold cavity. The piston had a central cylindrical passage with a diameter of 7 mm. therein, such passage being 50 mm. long so as to receive the upper end of the steel rod insert therewithin. The piston was subjected to a pressure of 3,000 kg./cm.$^2$. There was thus obtained a cylindrical insulator in which the central rod was securely bonded, the separation of the two elements being impossible without their destruction.

Although a limited number of embodiments of the invention have been described in the foregoing specification, it is to be especially understood that various changes, such as in the relative dimensions of the parts, materials used, and the like, as well as the suggested manner of use of articles made in accordance with the invention, may be made therein without departing from the spirit and scope of the invention as will now be apparent to those skilled in the art.

What is claimed is:

1. A vitreous body comprising mica in finely divided state in a vitreous matrix made up of a glass consisting essentially of at least one oxide of alkali metal ($R_2O$), said oxide of alkali metal containing at least one of the group consisting of $Na_2O$ and $K_2O$ and optionally $Li_2O$ in an amount not in excess of 5% by weight of the glass, at least one oxide of divalent metal of the group consisting of Zn, Ca, Mg, Sr, Cd, Ba, (RO), phosphoric anhydride ($P_2O_5$), and alumina ($Al_2O_3$), such constituents being present in the glass in the following molecular percentages, $d$ being the molecular percentage of the oxide of divalent metal:

oxide of divalent metal (RO)—from 6 to 20
phosphoric anhydride ($P_2O_5$)—from $$\left(36-\frac{d}{3}\right) \text{ to } (56-d)$$

alumina ($Al_2O_3$)—from 6 to $$\left(16+\frac{d}{6}\right)$$

oxide of alkali metal ($R_2O$)—from 22 to 42.5 the alumina content being less than 20% by weight of the glass, the glass constituting about 30 to 70% by weight of the body and the remainder of the body being substantially mica.

2. A vitreous body as claimed in claim 1, wherein the vitreous matrix is made of a glass containing additionally as oxide of alkali metal lithia, the lithia content being less than 5% by weight of the glass.

3. A vitreous body as claimed in claim 1, wherein the vitreous matrix is made of a glass containing $B_2O_3$ up to 7% by molecular percentage.

4. A vitreous body as claimed in claim 3, wherein the vitreous matrix is made of a glass containing additionally as oxide of alkali metal lithia, the lithia content being less than 5% by weight of the glass.

5. A method of making a vitreous body comprising mica in finely divided state in a vitreous matrix made of phosphoric glass which comprises making a mixture of finely divided mica and powdered phosphoric glass, compressing such mixture into bodies under a pressure greater than 1,000 kg./cm.$^2$, heating said bodies at a temperature less than 800° C. to soften the glass, pulverizing the resulting bodies, conforming the desired quantity of pulverized mixture at a temperature less than 800° C. to soften the glass and eventually by pressing said quantity of pulverized mixture in the hot state under a pressure greater than 1,000 kg./cm.$^2$, the glass consisting essentially of at least one oxide of alkali metal ($R_2O$), at least one oxide of divalent metal of the group consisting of Zn, Ca, Mg, Sr, Cd, Ba, (RO), phosphoric anhydride ($P_2O_5$), and alumina ($Al_2O_3$), and optionally boric anhydride ($B_2O_3$), these constituents being present in the glass in the following molecular percentages, $d$ being the molecular percentage of the oxide of divalent metal:

oxide of divalent metal (RO)—from 6 to 20 phosphoric anhydride ($P_2O_5$)—from $$\left(36-\frac{d}{3}\right) \text{ to } (56-d)$$

alumina ($Al_2O_3$)—from 6 to $$\left(16+\frac{d}{6}\right)$$

oxide of alkali metal ($R_2O$)—from 22 to 42.5, $B_2O_3$—from 0 to 7 the alumina content being less than 20% by weight of the glass, the oxide of alkali metal containing at least one of the group consisting of $Na_2O$ and $K_2O$ and optionally $Li_2O$, the $Li_2O$ content being less than 5% by weight of the glass, the glass constituting from about 30 to 70% by weight of the body, the remainder of said body being substantially mica.

6. A method of making a vitreous body having a metal insert therein and bonded thereto, said vitreous body comprising mica in finely divided state in a vitreous matrix made of phosphoric glass, said method comprising making a mixture of finely divided mica and powdered phosphoric glass, compressing such mixture into bodies under a pressure greater than 1,000 kg./cm.$^2$, heating said bodies at a temperature less than 800° C. to soften the glass, pulverizing the resulting bodies, conforming the desired quantity of pulverized mixture to a desired shape about a metal insert by heating said quantity of pulverized mixture at a temperature less than 800° C. to soften the glass and eventually by pressing said quantity of pulverized mixture in the hot state under a pressure greater than 1,000 kg./cm.$^2$, the glass consisting essentially of at least one oxide of alkali metal ($R_2O$), at least one oxide of divalent metal of the group consisting of Zn, Ca, Mg, Sr, Cd, Ba, (RO), phosphoric anhydride ($P_2O_5$), and alumina ($Al_2O_3$), and optionally boric anhydride ($B_2O_3$), these constituents being present in the glass in the following molecular percentages, $d$ being the molecular percentage of the oxide of divalent metal:

oxide of divalent metal (RO)—from 6 to 20
phosphoric anhydride ($P_2O_5$)—from $$\left(36-\frac{d}{3}\right) \text{ to } (56-d)$$

alumina ($Al_2O_3$)—from 6 to $$\left(16+\frac{d}{6}\right)$$

oxide of alkali metal ($R_2O$)—from 22 to 42.5, $B_2O_3$—from 0 to 7 the alumina content being less than 20% by weight of the glass, the oxide of alkali metal containing at least one of the group consisting of $Na_2O$ and $K_2O$ and optionally $Li_2O$, the $Li_2O$ content being less than 5% by weight of the glass, the glass constituting from about 30 to 70% by weight of the body, the remainder of said body being substantially mica.

References Cited by the Examiner
UNITED STATES PATENTS

| | | | |
|---|---|---|---|
| Re. 15,727 | 12/23 | Crossley | 106—39 X |
| 2,032,239 | 2/36 | Wedlock | 106—39 X |
| 2,196,974 | 4/40 | Boughton | 23—110 |
| 2,227,082 | 12/40 | Grimm et al. | 106—47 |
| 2,669,764 | 2/54 | Kilpatrick | 106—47 |
| 2,920,972 | 1/60 | Godron | 106—47 |
| 3,057,741 | 10/62 | Moore | 106—39 |

OTHER REFERENCES

Monack: Ceramic Industry, February 1947, "Rapid Insulator Production With Glass-Bonded Mica."

Mycalex Corporation, commercial bulletin (1956), "Ceramoplastics With Glass-Bonded Mica."

TOBIAS E. LEOW, *Primary Examiner*.